US012774686B2

(12) United States Patent
Sarder et al.

(10) Patent No.: US 12,774,686 B2
(45) Date of Patent: *Oct. 27, 2026

(54) DUAL FUEL LOCKOUT SWITCH FOR GENERATOR ENGINE

(71) Applicant: Champion Power Equipment, Inc., Las Vegas, NV (US)

(72) Inventors: Mark J. Sarder, Waukesha, WI (US); Aleko D. Sotiriades, Cedarburg, WI (US); James J. Dehn, Brookfield, WI (US); Leigh Jenison, Hartland, WI (US)

(73) Assignee: Champion Power Equipment, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/026,996

(22) Filed: Jan. 17, 2025

(65) Prior Publication Data

US 2025/0154911 A1 May 15, 2025

Related U.S. Application Data

(63) Continuation of application No. 18/443,487, filed on Feb. 16, 2024, which is a continuation of application
(Continued)

(51) Int. Cl.
*F02D 19/06* (2006.01)

(52) U.S. Cl.
CPC ..... *F02D 19/0613* (2013.01); *F02D 19/0605* (2013.01); *F02D 19/0647* (2013.01); *F02D 19/0673* (2013.01); *Y02T 10/30* (2013.01)

(58) Field of Classification Search
CPC ............ F02D 19/0673; F02D 19/0647; F02D 19/0605; F02D 19/0613
See application file for complete search history.

(56) References Cited

U.S. PATENT DOCUMENTS

| | | | |
|---|---|---|---|
| 574,763 | A | 1/1897 | Rudolph |
| 1,679,159 | A | 7/1928 | French |

(Continued)

FOREIGN PATENT DOCUMENTS

| | | | |
|---|---|---|---|
| CN | 2060477 | U | 8/1990 |
| CN | 2401704 | Y | 10/2000 |

(Continued)

OTHER PUBLICATIONS

Kubota., Gasoline/LPG Engine WG752-E2, DF752-E2 Workshop Manual, Kubota Engine Technical Documentation, 2003, 154 pages.

(Continued)

*Primary Examiner* — Kevin A Lathers
(74) *Attorney, Agent, or Firm* — Husch Blackwell LLP

(57) ABSTRACT

A mechanical fuel lockout switch for a dual fuel engine includes a mechanical fuel valve actuatable between a first position and a second position to selectively control fuel flow to the dual fuel engine from a first fuel source through a first fuel line and a second fuel source through a second fuel line. The mechanical fuel lockout switch may also include a fuel lockout apparatus coupled to the mechanical fuel valve. The mechanical fuel valve may be configured to allow communication between the first fuel source and the dual fuel engine and prevent communication between the second fuel source and the dual fuel engine while in the first position, and prevent communication between the first fuel source and the dual fuel engine while in the second position.

8 Claims, 5 Drawing Sheets

Related U.S. Application Data

No. 18/183,734, filed on Mar. 14, 2023, now Pat. No. 11,905,895, which is a continuation of application No. 17/937,046, filed on Sep. 30, 2022, now Pat. No. 11,840,970, which is a continuation of application No. 16/783,455, filed on Feb. 6, 2020, now Pat. No. 11,492,985, which is a continuation of application No. 16/191,503, filed on Nov. 15, 2018, now Pat. No. 11,530,654, which is a continuation of application No. 14/738,060, filed on Jun. 12, 2015, now Pat. No. 10,221,780.

(56) References Cited

U.S. PATENT DOCUMENTS 1,827,214 A 10/1931 Fritz
1,931,698 A 10/1933 Holzapfel
2,122,206 A 6/1938 Keefe
2,398,437 A 4/1946 Mcgill et al.
2,645,570 A 7/1953 Anderson
2,672,189 A 3/1954 Lloyd
2,861,591 A 11/1958 Andrew
2,945,111 A 7/1960 Mccormick
3,250,264 A 5/1966 Earl
3,384,059 A 5/1968 Kopa
3,412,258 A 11/1968 William
3,659,574 A 5/1972 Reschke et al.
3,696,333 A 10/1972 Mott
3,718,000 A 2/1973 Walker
3,783,849 A 1/1974 Bramfitt
3,807,377 A 4/1974 Hirschler et al.
3,888,223 A 6/1975 Mondt
3,911,956 A 10/1975 Lebreton et al.
3,982,516 A 9/1976 Abernathy
4,065,096 A 12/1977 Frantz et al.
4,287,908 A 9/1981 Storgard
4,297,742 A 10/1981 Heitzman et al.
4,323,046 A 4/1982 Barber
4,335,694 A 6/1982 Mausner et al.
4,335,697 A 6/1982 McLean
4,347,195 A 8/1982 Ogawa
4,353,345 A 10/1982 Ebihara
4,354,477 A 10/1982 Sprick
4,364,370 A 12/1982 Smith et al.
4,370,969 A 2/1983 Zarrelli et al.
4,372,276 A 2/1983 Bernhardsson et al.
4,373,493 A 2/1983 Welsh
4,375,795 A 3/1983 Billingsley
4,393,848 A 7/1983 Poehlman
4,416,244 A 11/1983 McDonald
4,450,821 A 5/1984 Venning et al.
4,463,735 A 8/1984 Stoltman
4,471,805 A 9/1984 Solie et al.
4,480,595 A 11/1984 Hobby et al.
4,489,699 A 12/1984 Poehlman
4,492,207 A 1/1985 Hallberg
4,502,453 A 3/1985 Kabasin et al.
4,574,763 A 3/1986 Hallberg
4,619,240 A 10/1986 Bedford et al.
4,628,871 A 12/1986 Glass
4,641,625 A 2/1987 Smith
4,708,094 A 11/1987 Helmich et al.
4,750,514 A 6/1988 Omori et al.
4,776,988 A 10/1988 Neal
4,788,960 A 12/1988 Oshizawa
4,811,720 A 3/1989 Katumata et al.
4,878,475 A 11/1989 Birsa
4,895,124 A 1/1990 Bartholomew
4,979,480 A 12/1990 Daikoku et al.
5,092,305 A 3/1992 King
5,161,496 A 11/1992 Matsushima et al.
5,171,487 A 12/1992 Hudz
5,172,723 A 12/1992 Sturgis
5,228,423 A 7/1993 Oikawa et al.
5,287,839 A 2/1994 Kondou et al.
5,301,644 A 4/1994 Olmr
5,320,078 A 6/1994 Lorraine
5,325,835 A 7/1994 Kimata et al.
5,379,740 A 1/1995 Moore et al.
5,419,291 A 5/1995 Kimata et al.
5,438,968 A 8/1995 Johnson et al.
5,450,832 A 9/1995 Graf
5,555,873 A 9/1996 Nolen
5,611,312 A 3/1997 Swanson et al.
5,673,670 A 10/1997 Powell et al.
5,682,845 A 11/1997 Woody
5,718,265 A 2/1998 Elsdon et al.
5,809,979 A 9/1998 Tsuda et al.
5,816,224 A 10/1998 Welsh et al.
5,934,320 A 8/1999 Paul
6,082,323 A 7/2000 Winberg
6,213,083 B1 4/2001 Winberg
6,223,730 B1 5/2001 Hasegawa et al.
6,276,345 B1 8/2001 Nelson et al.
6,401,685 B1 6/2002 Warner
6,453,877 B1 9/2002 Lucier et al.
6,543,395 B2 4/2003 Green
6,591,817 B2 7/2003 Deutsch
6,640,770 B2 11/2003 Woody
6,886,508 B1 5/2005 Luffy
6,914,342 B1 7/2005 French
7,165,536 B2 1/2007 Kirk et al.
7,261,280 B2 8/2007 Takano et al.
7,404,546 B2 7/2008 Prager et al.
7,481,087 B2 1/2009 De Vries
7,549,403 B2 6/2009 Yamamoto et al.
7,591,257 B2 9/2009 Bayer et al.
7,802,562 B2 9/2010 Lippa et al.
7,905,469 B2 3/2011 Nickels et al.
7,954,479 B2 6/2011 Kojima et al.
8,040,663 B1 10/2011 Czarnecki
8,042,569 B2 10/2011 Morris
8,082,947 B2 12/2011 Chang et al.
8,092,305 B2 1/2012 Seelig et al.
8,342,158 B2 1/2013 Ulrey et al.
8,408,183 B2 4/2013 Johnson
8,465,277 B2 6/2013 Deng
8,517,718 B2 8/2013 Deng
8,590,510 B2 11/2013 Surnilla et al.
8,613,276 B2 12/2013 Parrish
8,616,159 B1 12/2013 Hawkins
8,757,139 B2 6/2014 Deng
8,887,799 B2 11/2014 Robichaux et al.
8,944,027 B2 2/2015 Montgomery
9,175,601 B2 11/2015 Markoski
9,435,273 B2 9/2016 Sarder et al.
9,523,497 B2 12/2016 Deng
9,702,480 B2 7/2017 Hoots et al.
9,988,990 B2 6/2018 Bhatt et al.
10,221,780 B2 * 3/2019 Sarder ................. F02D 19/0673
10,337,399 B2 7/2019 Rumao et al.
10,598,101 B2 3/2020 Sarder et al.
11,306,667 B2 4/2022 Sarder et al.
11,530,654 B2 12/2022 Sarder et al.
11,761,390 B2 9/2023 Sarder et al.
11,905,895 B2 * 2/2024 Sarder ................. F02D 19/0647
11,905,896 B2 2/2024 Sarder et al.
2002/0125115 A1 9/2002 Burkholder et al.
2002/0134362 A1 9/2002 Deutsch
2004/0094116 A1 5/2004 Nishida et al.
2004/0240141 A1 12/2004 Stolt et al.
2004/0246118 A1 12/2004 Tharman et al.
2006/0169238 A1 8/2006 Mazuka et al.
2006/0236976 A1 10/2006 Carlson
2007/0137591 A1 * 6/2007 Sugimoto ............. F02M 21/06
123/527
2007/0215223 A1 9/2007 Morris
2009/0211555 A1 8/2009 Fischer et al.
2009/0320789 A1 12/2009 Lund
2010/0258099 A1 10/2010 Andersson et al.
2010/0330518 A1 12/2010 Deng
2011/0011369 A1 1/2011 Jaasma et al.
2011/0100335 A1 5/2011 Parlatore et al.
2011/0140290 A1 6/2011 Kumagai et al.

(56) References Cited

U.S. PATENT DOCUMENTS

| | | | |
|---|---|---|---|
| 2011/0168133 A1 | 7/2011 | Pursifull et al. | |
| 2011/0253102 A1 | 10/2011 | Watanabe | |
| 2012/0193558 A1 | 8/2012 | Hoots et al. | |
| 2013/0047964 A1 | 2/2013 | Kim | |
| 2013/0098349 A1 | 4/2013 | Deng | |
| 2013/0122439 A1 | 5/2013 | Deng | |
| 2013/0168969 A1 | 7/2013 | Markoski | |
| 2013/0220274 A1 | 8/2013 | Deshpande et al. | |
| 2014/0202430 A1 | 7/2014 | Monros | |
| 2014/0239645 A1 | 8/2014 | Jungmann | |
| 2014/0338634 A1 | 11/2014 | Mitchell et al. | |
| 2015/0034025 A1 | 2/2015 | Markoski et al. | |
| 2015/0122230 A1* | 5/2015 | Sarder | F02D 19/0676 137/15.18 |
| 2015/0308356 A1 | 10/2015 | Taniguchi | |
| 2017/0009670 A1 | 1/2017 | Sorge et al. | |
| 2017/0130676 A1 | 5/2017 | Markoski et al. | |
| 2018/0080392 A1 | 3/2018 | Janscha | |
| 2019/0323424 A1 | 10/2019 | Markoski et al. | |

FOREIGN PATENT DOCUMENTS

| | | | |
|---|---|---|---|
| CN | 1981121 | A | 6/2007 |
| CN | 200952429 | Y | 9/2007 |
| CN | 101191439 | A | 6/2008 |
| CN | 100402819 | C | 7/2008 |
| CN | 101915169 | A | 12/2010 |
| CN | 203146142 | U | 8/2013 |
| CN | 203248280 | U | 10/2013 |
| CN | 104047710 | A | 9/2014 |
| CN | 204082326 | U | 1/2015 |
| CN | 104047710 | B | 7/2016 |
| DE | 102006008524 | A1 | 8/2006 |
| EP | 1826377 | A2 | 8/2007 |
| EP | 1745201 | B1 | 6/2010 |
| FR | 2220679 | B1 | 9/1976 |
| FR | 2480355 | A1 | 10/1981 |
| FR | 2510660 | A1 | 2/1983 |
| GB | 189800 | A | 10/1923 |
| GB | 532903 | A | 2/1941 |
| GB | 2485761 | A | 5/2012 |
| IN | 20733 | B | 3/1934 |
| JP | S6128734 | A | 2/1986 |
| JP | S63186928 | A | 8/1988 |
| JP | H0466743 | A | 3/1992 |
| JP | H07103006 | A | 4/1995 |
| JP | H1182083 | A | 3/1999 |
| JP | H11190220 | A | 7/1999 |
| JP | 2004293475 | A | 10/2004 |
| JP | 2005330867 | A | 12/2005 |
| JP | 2015048776 | A | 3/2015 |
| WO | 1999001659 | A1 | 1/1999 |
| WO | 2007048633 | A | 5/2007 |

OTHER PUBLICATIONS

Genie., GS-2668 RT/GS-3268 RT Operator's Manual, Genie Industries Technical Documentation, 2005, 39 pages.

Genie., Z-34/22IC Service Manual, Genie Industries Technical Documentation, 2007, 214 pages.

MEC., 3072RT/3772RT/3772RT HD Service and Parts Manual, MEC Aerial Work Platforms Technical Documentation, 2008, 235 pages.

SCAG., Turf Tiger Operators Manual, SCAG Power Equipment Technical Documentation, 73 pages.

Champion, Champion Generator Model 41532 Converted Using US Carburetion Conversion Kit Type C, Conversion Documentation, 33 pages.

Champion Power Equipment., Model 100153 Manual, Champion Power Equipment Technical Documentation, Dec. 4, 2014, retrieved from http://www.championpowerequipment.com/media/2400/100153_manual-english_12-4-14.pdf. 35 pages.

DuroMax., Dual Fuel Generator Model XP4400EH Manual, DuroMax Power Equipment Technical Documentation, 32 pages.

Firman, ECO4000RE & ECO7000RE Electic/Remote Start Generators, Flyer, 4 pages.

Firman, ERD9000E Dual Fuel Generator Owner's Manual, 61 pages.

Firman, 00007773, Firman Internal Reference Document, 2 pages.

Honda., EU2000i Owner's Manual, Honda Power Equipment Technical Documentation, 76 pages.

Honda EU20i LPG, YouTube, Mar. 20, 2012, https://www.youtube.com/watch?v=yBpq33aJmRO.

Johnson et al., Electronic Direct Fuel Injection (EDFI) for Small Two-Stroke Engines, SAE Technical Paper 1999-01-3312, Proceedings of the 1999 SAE Small Engine Technology Conference, Madison, WI, Sep. 28-30, 1999, pp. 1-15.

Kubota, Workshop Manual: Gasoline/LPS Engine: WG752-E2, DF752-E2 125 pages.

Champion, Dual Fuel Generator Model Model 100153 Manual, Technical Documentation, 34 pages.

Champion, Dual Fuel Generator Model Model 71530 Manual, Technical Documentation, 34 pages.

Champion, Dual Fuel Generator Model 71531 Manual, Technical Documentation, 34 pages.

Champion, Dual Fuel Generator Model 71532 Manual, Technical Documentation, 34 pages.

Champion, Dual Fuel Generator Model Model 76533 Manual, Technical Documentation, 34 pages.

Champion, Dual Fuel Generator Model Model 76555 Manual, Technical Documentation, 31 pages.

Multi-Power Ltd., Multi-Power Dual Fuel Generator Model MP5500DF Owner's Manual, Multi-Power Generator Documentation, 39 pages.

Multi-Power Ltd., Model MP5500DF 13 HP Generator Owner's Manual, Multi-Power Generator Documentation, Jul. 2006, pp. 1-38.

JLG., 260MRT Illustrated Parts Manual, JLG Industries Technical Documentation, Oct. 2013, 197 pages.

Phoenix., NG/LPG/Gasoline Tri-Fuel Generator Operation Manual, Phoenix Generator Technical Documentation, 4 pages.

Phoenix., Tri-Fuel Generator Model CDY2500L Manual, Phoenix Generator Technical Documentation, 28 pages.

Powerland Industrial Tools., Powerland Tri Fuel Generator Owner's Manual, Powerland Technical Documentation, Dec 24, 2015, pp. 1-41.

Smarter Tools., Dual Fuel Generator Model ST-GP7500DEB Manual, Smarter Tools Technical Documentation, 40 pages.

Smith, E., Sportsman Dual Fuel (Natural Gas/Propane Gas) Generator, YouTube, Dec 12, 2012, https://www.youtube.com/watch?v=K6iMO6R9iMM,.

Winco., Generator Models HPS6000HE, HPS9000VE, and HPS12000HE Manual, Winco Generator Technical Documentation, 20 pages.

Winco Inc., Dyna DL9000E, DL5000H, and D3000 Portable Generators Installation, Operation, and Maintenance Instructions, Winco Generator Technical Documentation, Nov. 21, 2017, pp. 1-12.

Winco Inc., Dyna ME5000VA Installation, Operation, and Maintenance Instructions, Winco Generator Technical Documentation, Nov. 21, 2017, pp. 1-12.

Winco Inc., Home Power TRI-FUEL Portable Generators Owners Manual, Winco Generator Technical Documentation, Nov. 21, 2017, pp. 1-16.

Winco Inc., HPS9000VE/E and HPS9000VE-03/A Generator Installation and Operators Manual, Winco Generator Technical Documentation, Aug. 9, 2013, pp. 1-16.

Yamaha EF2000iS Tri Fuel Conversion: Overview & Installation Tips, Jan. 3, 2014, https://www.youtube.com/watch?v=caZawwDaRQg.

64585-105 Instruction Sheet Fuel Shut-Off Solenoid Kit HPS12000HE/E (49 STATE), Winco Inc, 1 page, 2012, retrieved from the Internet <https://www.absolutegenerators.com/media/blfa_files/winco_hps12000he-e_49_state_fuel_sol_inst_sht. pdf> on Oct. 31, 2024.

64585-106 Instruction Sheet Fuel Shut-Off Solenoid Kit Csa HPS6000HE/H (49 STATE), Winco Inc, 1 page, 2012, retrieved

(56) References Cited

OTHER PUBLICATIONS from the Internet <https://www.absolutegenerators.com/media/blfa_files/winco_csahps6000he-h_49_state_fuel_sol_inst_sht. pdf> on Oct. 31, 2024.
64585-107 Instruction Sheet Fuel Shut-Off Solenoid Kit HPS9000VE/D, Winco Inc, 2012, 1 page, retrieved from the Internet <https://www.absolutegenerators.com/media/blfa_files/winco_hps9000ve-d_fuel_sol_inst_sht_ 1 _. pdf> on Oct. 31, 2024.
AFC Model 142 Filter Shut-Off Valve Larger View, webpage <http:/www.afcvalves.com/mod142.html>, 2 pages, Feb. 16, 2007, retrieved from Internet Archive Wayback Machine <https://web.archive.org/web/20070216090625/ http:/www.afcvalves.com/image/mod142_side_big.jpg> on Oct. 31, 2024.
AFC Model 142 Filter Shut-Off Valve, webpage <http:/www.afcvalves.com/mod142.html>, 2 pages, Feb. 12, 2007, retrieved from Internet Archive Way back Machine <https://web.archive.org/web/20070212092045/http:/www_afcvalves.com/mod142.html> on Oct. 28, 2024.
Bill of Lading/ Delivery Order [for RD9000E], International Forwarders, Inc, 1 page, Jun. 18, 2015.
Dealer Flyer [for RD9000E], Firman, 3 pages, assume May 7, 2015.
Dual Fuel Hybrid Elite XP4400EH Owners Manual, DuroMax Power Equipment, Inc, 36 pages, Aug. 26, 2013, retrieved from the Internet <https://www.absolutegenerators.com/media/blfa_files/XP4400EH_RV42613 _. pdf> on Feb. 24, 2025.
ECO2990, ECO2990E, ECO3990, ECO3990, ECO7990, ECO7990E, ECO8990, ECO890E Owner's Manual, Firman, pages, assume Oct. 31, 2013.
EU20i Owners Manual, Honda, 244 p. 2013, retrieved from the Internet<https://sailing-yacht.de/wp-content/uploads/2020/11/Manual-Honda-EU20i.pdf> on Oct. 31, 2024.
Gas Kits Installation Instruction, SUMEC, 1 page, assume Oct. 31, 2013.
Gasoline Powered Generator Owner's Manual, MaxTool LLC, 28 pages, Aug. 13, 2010, retrieved from the Internet <https://device.report/m/8c72e11 c948bf71 c71 aecbc7f79111 dbd6f00e5d44d07b8fada3655ff539d759.pdf> on Feb. 25, 2025.
Generator EU20i Owner's Manual, Honda, 237 pages, 2013, retrieved from the Internet <https://www.honda.co.jp/ownersmanual/pdf/power/generator/36Z396000_web.pdf?genpo=HondaMotorEurope&model=EU20I> on Oct. 31, 2024.
Generator EU20i Owner's Manual, Honda, 238 pages, 2012, retrieved from the Internet <https://www.honda.co.jp/ownersm an ual/pdf /power/generator/36Z076131_Eng_ web. pdf?genpo=HondaMotorEurope&m odel=EU20I> on Oct. 31, 2024.
Generator EU20i Owner's Manual, Honda, 238 pages, 2013, retrieved from the Internet <https://data2.manualslib.com/pdf6/128/12708/1270779-honda/eu20i. pdf?e932c99033edfc93bae27280f0e2dd2e> on Oct. 31, 2024.
Generator EU20i Owner's Manual, Honda, 238 pages, 2015.
Generator EU20i Owner's Manual, Honda, 270 pages 2012, retrieved from the Internet <https://www.honda.co.jp/ownersm an ual/pdf /power/generator/36Z076170_Eng_ web. pdf?genpo=HondaMotorEurope&m odel=EU20I > on Oct. 31, 2024.
Generator EU20i Owner's Manual, Honda, 69 pages 2010, retrieved from the Internet <https://utopiacam.com/wpcontent/uploads/2016/08/honda-20i-instruction-manual. pdf> on Oct. 28, 2024.
Generator EU20i Owners Manual, Honda, 70 pages 2010, retrieved from the Internet <https://www.honda.co.jpownersmanual/pdf/power/generator/32Z07612_web. pdf?genpo=HondaMotorEurope&model=EU20I > on Oct. 31, 2024.
GX120K1 Parts Catalogue 9, Honda Motor Co., Ltd., 216 pages, 2008, retrieved from the Internet <https://www.Isengineers. co.uk/media/advice_centre/Honda/GX 120/gx120-parts-diagram. pdf> on Feb. 25, 2025.
Hose connections to portable tanks, webpage <http://www.nooutage.com/images/BS-7KW_Power_Now_tanks.jpg>, 1 page, Sep. 28, 2006, retrieved from Internet Archive Wayback Machine <https://web.archive.org/web/20060928183104/http://www.nooutage.com/images/BS-7KW_Power_Now_tanks.jpg> on Oct. 28, 2024.
HPS12000HE, HPS12000HE-03/A Generator Installation and Operators Manual, Winco Inc, 16 pages, assume Sep. 1, 2013, retrieved from the Internet <https://www.wincogen.com/wp-content/uploads/PD/Manuals/Portables/60706-236_HPS12000HE_OPM.pdf> on Oct. 31, 2024.
Hps12000HE, HPS12000HE-03/A, HPS12000HE-03/B Generator Installation and Operators Manual, Winco Inc., 20 pages, assume Sep. 1, 2013, retrieved from the Internet <https://www.wincogen.com/wp-content/uploads/PD/Manuals/Portables/60706-236_HPS12000HE_OPM.pdf >on Oct. 31, 2024.
HPS12000HE/F Installation and Operators Manual, Winco Inc., 20 pages, Oct. 4, 2013, retrieved from the Internet <https://www.electricgeneratorsdirect.com/manuals/winco%20hps 12000he%20manual%202013. pdf> on Oct. 30, 2024.
HPS6000HE/I, HPS6000HE-03/A, HPS6000HE-03/B Generator Installation and Operators Manual, Winco Inc., 20 pages, assume Sep. 1, 2013, retrieved from the Internet <https://www.wincogen.com/wp-content/uploads/PD/Manuals/Portables/60706-238_HPS6000HE_OPM.pdf> on Oct. 31, 2024.
HPS9000VE/E, HPS9000VE-03/A, HPS9000VE-03/B Generator Installation and Operators Manual, Winco Inc., 20 Pages, assume Sep. 1, 2013, retrieved from the Internet <https://www.wincogen.com/wp-content/uploads/PD/Manuals/Portables/60706-237 HPS9000VE_OPM.pdf> on Oct. 31, 2024.
Initial setup with portable LP tanks, webpage <http://www.nooutage.com/images/BS-7KW_Power_Now_ 1.jpg>, 2 pages, Oct. 17, 2007, retrieved from Internet Archive Wayback Machine <https://web.archive.org/web/20071017151408/http://www.nooutage.com/images/BS-7KW_Power_Now_ 1.jpg> on Oct. 28, 2024.
Initial setup with portable LP tanks, webpage <http://www.nooutage.com/images/BS-7KW_Power_Now_tanks2.jpg>, 1 page, Oct. 17, 2007, retrieved from Internet Archive Wayback Machine <https://web.archive.org/web/20071017203103/http://www.nooutage.com/images/BS-7KW_Power_Now_tanks2.jpg> on Oct. 28, 2024.
Installation Instructions Low Pressure Fuel Solenoid Kit for Model HPS12000HE/F, Winco Inc., 4 pages, Oct. 24, 2013, retrieved from the Internet <https://www.wincogen.com/wp-content/uploads/PD/Instructions/64854-009|_HPS12-FUEL-SOLENOID-KIT-INST.pdf> on Oct. 29, 2024.
Installation Instructions Low Pressure Fuel Solenoid Kit for Models HPS6000HE/I, HPS9000VE/E, Winco Inc., 4 pages, Sep. 19, 2013, retrieved from the Internet <https://www.wincogen.com/wp-content/uploads/PD/instructions/64854-0051_HPS6-9-FUEL-SOLENOID-KIT-INST.pdf> on Oct. 29, 2024.
Invoice [for RD9000E], Sumec N.A.—Firman Generators, 1 page, Jun. 16, 2015.
Model STT Dual-Fuel Illustrated Parts Manual, Scag Power Equipment, 28 pages, Nov. 28, 2010, retrieved from Internet Archive Wayback Machine <https://web.archive.org/web/20101128005515/http://scag.com/OpManuals/STT/2009STTIPL/STT-DF IPL_06201.pdf> on Oct. 31, 2024.
Model STT Dual-Fuel Illustrated Parts Manual, Scag Power Equipment, 32 pages, Jun. 28, 2013, retrieved from Internet Archive Wayback Machine <https://web.archive.org/web/20130628045523/http://scag.com/OpManuals/STT/2011 Sttipl/Stt-Df IPL_06216.pdf> on Oct. 31, 2024.
Natural Gas Low Pressure Hose and Propane Low Pressure Hose, GasHoseandRegulators.com, webpage <http://gashosesandregulators.com/lowpressurehoses.html>, 5 pages, Sep. 27, 2014, retrieved from Internet Archive Wayback Machine <https://web.archive.org/web/20140927183111/http://gashosesandregulators.com/lowpressurehoses.html> on Apr. 9, 2025.
North Star M165938R Owner's Manual, Northern Tool+ Equipment Co., 50 pages, 2011, retrieved from the Internet <https://assets.northerntool.com/products/165/documents/manuals/165938.pdf> on Oct. 28, 2024.
Operator's Manual Model No. 100230, Champion Power Equipment, Inc., 34 pages, assume Jun. 8, 2015.
Operator's Manual Model No. 100230, Champion Power Equipment, Inc., 35 pages, assume Jun. 8, 2015.
Operator's Manual Model No. 76533, Champion Power Equipment, Inc., 39 pages, assume Jul. 28, 2014.

(56) References Cited

OTHER PUBLICATIONS

Outlet panel, webpage <http://www.nooutage.com/images/BS-7KW_Power_Now_panel.jpg>, 1 page, Sep. 27, 2006, retrieved from Internet Archive Way back Machine <https://web.archive.org/web/20060927043638/http://www.nooutage.com/images/BS-7KW_Power_Now_panel.jpg> on Oct. 28, 2024.
Owner's Manual & Operating Instructions Model 71530, Champion Power Equipment, Inc., 34 pages, assume Apr. 26, 2014.
Owner's Manual & Operating Instructions Model No. 100122, Champion Power Equipment, Inc., 33 pages, assume Jan. 28, 2015.
Owner's Manual & Operating Instructions Model No. 100155, Champion Power Equipment, Inc., 35 pages, assume Feb. 11, 2015.
Owner's Manual & Operating Instructions Model No. 41135, Champion Power Equipment, Inc., 29 pages 2011, retrieved from the Internet <https://apelectriccom/content/PDF/Champion/41135%20Owners%20Manual. pdf> on Feb. 24, 2025.
Owner's Manual & Operating Instructions Model No. 71531, Champion Power Equipment, Inc., 33 pages, assume Apr. 24, 2014.
Owner's Manual & Operating Instructions Model No. 71532, Champion Power Equipment, Inc., 33 pages, assume Jan. 25, 2014.
Owner's Manual & Operating Instructions Model No. 76555, Champion Power Equipment, Inc., 34 pages, assume Dec 21, 2014.
Owner's Manual GX120-GX160, Honda Motor Co., Ltd., 39 pages, 1990, retrieved from the Internet <https://cdn.powerequipment.honda.com/engines/pdf/manuals/31ZH7600.pdf> on Feb. 24, 2025.
Packing Slip [for RD9000E], Firman, 1 page, Jun. 1, 2015.
Parts Information Model No. 100230, Champion Power Equipment, Inc., 10 pages, assume Jun. 8, 2015.
Parts Information Model No. 76533, Champion Power Equipment, Inc., 10 pages, assume Jul. 28, 2014.
Propane regulator facts, propane facts, propane 101, high pressure and low pressure, types of propane regulators, and a word about propane tanks . . . , GasHoseandRegulators.com, webpage <http://gashosesandregulators.com/propaneregulatorfacts. html>, pages, Oct. 6, 2014, retrieved from Internet Way back Machine <https://web.archive.org/web/20141006083034/http://gashosesandregul ators. com/propaneregul atorfacts. html>.
RD9000E Owner's Manual, SUMEC North America, 60 pages, assume Apr. 20, 2015.
RD9000E Schematic, SUMEC, 1 page, assume May 7, 2015.
Shipment Request [for RD9000E], International Forwarders, Inc, 2 pages, Jun. 18, 2015.
ST-GP7500DEB Owner's Manual, Smarter Tools, Inc, 39 p. 2012, retrieved from the Internet <https://images.thdstatic com/catalog/pdfl mages/a1 /a 1fe0e60-a3bc-4e 7 e-b102-f3f1 dff386b2. pdf> on Feb. 24, 2025.
Turf Tiger Dual Fuel Model STT61V-29KB-DF Operator's Manual, Scag Power Equipment, 72 pages, 2009, retrieved from the Internet <https://www.scag.com/wp-content/uploads/2020/04/STT-Dual-Fuel_Book_03252. pdf> on Oct. 28, 2024.
Turf Tiger Dual Fuel Model STT61V-31 KB-OF Operator's Manual, Scag Power Equipment, 76 pages, Nov. 22, 2011, retrieved from Internet Archive Way back Machine <https://web.archive.org/web/20111122221248/http://scag.com/OpManuals/STT/2011 STTOPMAN/STT Book_03278.pdf> on Oct. 31, 2024.
WG972-E2, DF972-E2, DG972-E2 Workshop Manual, Kubota Corporation, 153 p. 2009, retrieved from the Internet <https://www.allpowerlabs.com/wp-content/uploads/2015/05/Workshop-Manual-WG-DF-DG972.pdf> on Oct. 28, 2024.
Screen captures from YouTube video titled DuroStar DS4000Sr, 9 pages, uploaded Aug. 27, 2013 by user DurostarGenerators TV, retrieved from the Internet <https://www.youtube.com/watch?v=HFYYaNVChJc> on Feb. 25, 2025.
Screen captures from YouTube video titled Honda Generator Tri-Fuel, EU2000i Triple-Fuel, 7 pages, uploaded on Oct. 2, 2011 by user Mark 'Mark1 Jordon1' Kash, retrieved from Internet <https://www.youtube.com/watch? V=DpknaAPTQ9U> on Oct. 28, 2024.
Screen captures from YouTube video titled Sportsman Dual Fuel (Natural Gas/Propane Gas) Generator, 5 pages, uploaded Dec 12, 2012 by user Eric Smith, retrieved from the Internet <https://www.youtube.com/watch?v=K6iMO6R9iMM> on Feb. 25, 2025.

* cited by examiner

DUAL FUEL LOCKOUT SWITCH FOR GENERATOR ENGINE

CROSS-REFERENCE TO RELATED APPLICATION

The present application is a continuation of, and claims priority to, U.S. patent application Ser. No. 18/443,487, filed on Feb. 16, 2024, which is a continuation of, and claims priority to, U.S. patent application Ser. No. 18/183,734, filed on Mar. 14, 2023, now U.S. Pat. No. 11,905,895, which is a continuation of, and claims priority to, U.S. patent application Ser. No. 17/937,046, filed on Sep. 30, 2022, now U.S. Pat. No. 11,840,970, which is a continuation of, and claims priority to, U.S. patent application Ser. No. 16/783,455, filed on Feb. 6, 2020, now U.S. Pat. No. 11,492,985, which is a continuation of, and claims priority to, U.S. patent application Ser. No. 16/191,503, filed on Nov. 15, 2018, now U.S. Pat. No. 11,530,654, which is a continuation of, and claims priority to, U.S. patent application Ser. No. 14/738,060, filed on Jun. 12, 2015, now U.S. Pat. No. 10,221,780, the disclosures of which are incorporated herein by reference in their entirety.

BACKGROUND OF THE INVENTION

Embodiments of the invention relate generally to dual fuel generators, and more particularly, to an apparatus and method for delivering liquid fuel and gaseous fuel to a dual fuel generator.

Electric generators are frequently driven by internal combustion engines that use gasoline as a fuel source. Gasoline is a common fuel source for generators in a variety of applications. However, alternative fuel sources also provide a desirable fuel source. For instance, alternative fuels may provide a clean burning fuel that limits hazardous emissions. Alternative fuels may also be stored for long periods of time without degradation, whereas gasoline can degrade over a period of months leading to hard starting, rough running, and also lead to gum and varnish deposit left in the fuel system. In addition, generators that operate on alternative fuels may generate electricity when gasoline is not readily available. For instance, generators are frequently used when power outages in the utility grid result from severe weather. Unfortunately, gas stations may also be closed as a result of the power outage. Such a circumstance presents just one example where it would be advantageous to operate electrical generators on alternative fuels.

Certain generators are configured to operate as “dual fuel” generators, otherwise known as bi-fuel generators. These generators are driven by an internal combustion engine that is configured to operate on a liquid fuel for a period of operation and an alternative fuel for another period of operation. The alternative fuel source may exist in a gaseous state at normal temperature and pressure and can be any one of liquefied petroleum gas, compressed natural gas, hydrogen, or the like. Liquefied petroleum gas (LPG), often referred to as propane, exists in a gaseous state at normal temperature and pressure but can be conveniently stored under pressure in a liquid state. LPG may be a desirable fuel source for internal combustion engines because it can be stored for longer periods of time and contains fewer impurities than gasoline, resulting in smoother and cleaner operation, and often resulting in a longer lasting engine.

In order to provide the liquid and gaseous fuel to the engine, the dual fuel engine may have a first fuel line for liquid fuel and a second fuel line for gaseous fuel. A liquid fuel source and a gaseous fuel source may be coupled to the respective lines to provide fuel to the engine. However, a common problem with such configurations that couple two fuel sources to a single engine is the engine can experience overly rich air-fuel ratio when both fuels are simultaneously engaged during cross-over switching between the fuel sources. Further, such simultaneous delivery of fuel from the first fuel line and the second fuel line may make the engine hard to start or lead to unstable operating conditions.

Therefore, it would be desirable to design a dual fuel generator having a liquid fuel and gaseous fuel delivery system that overcomes the aforementioned detriments without substantially increasing the overall cost of the system.

BRIEF DESCRIPTION OF THE INVENTION

In accordance with one aspect of the invention, a mechanical fuel lockout switch for a dual fuel engine includes a mechanical fuel valve actuatable between a first position and a second position to selectively control fuel flow to the dual fuel engine from a first fuel source through a first fuel line and a second fuel source through a second fuel line. The mechanical fuel valve may be configured to allow communication between the first fuel source and the dual fuel engine and prevent communication between the second fuel source and the dual fuel engine while in the first position, and prevent communication between the first fuel source and the dual fuel engine while in the second position. The mechanical fuel lockout switch may also include a fuel lockout apparatus coupled to the mechanical fuel valve and configured to prevent the second fuel source from coupling to the second fuel line while the mechanical fuel valve is in the first position, and permit the second fuel source to couple to the second fuel line while the mechanical fuel valve is in the second position.

In accordance with another aspect of the invention, a mechanical fuel lockout switch for a dual fuel engine includes a mechanical fuel valve actuatable between a first position and a second position to selectively control fuel flow to the dual fuel engine from a first fuel source through a first fuel line and a second fuel source through a second fuel line. The mechanical fuel valve may be configured to allow communication between the first fuel source and the dual fuel engine and prevent communication between the second fuel source and the dual fuel engine while the first position, and prevent communication between the first fuel source and the dual fuel engine while in the second position. The mechanical fuel lockout switch may also include a fuel lockout apparatus coupled to the mechanical fuel valve and configured to prevent actuation of the mechanical fuel valve to the first position when the second fuel source is in communication with the dual fuel engine.

In accordance with yet another aspect of the invention, a dual fuel generator and fuel delivery system includes a dual fuel generator configured to operate on a liquid fuel supplied from a liquid fuel source through a liquid fuel line and a gaseous fuel supplied from a pressurized fuel source through a gaseous fuel line, and a fuel regulator system located off board the dual fuel generator. The fuel regulator system may include a primary pressure regulator couplable to a service valve of the pressurized fuel source and configured to regulate the gaseous fuel supplied from the pressurized fuel source to a reduced pressure, and a secondary pressure regulator couplable to the primary pressure regulator and configured to regulate the gaseous fuel supplied from the primary pressure regulator to a desired pressure for delivery through the gaseous fuel line to operate the dual fuel generator. The dual fuel generator and fuel delivery system may also include a mechanical fuel valve actuatable between a first position and a second position to selectively control fuel flow to the dual fuel generator from the liquid fuel source through the liquid fuel line and the pressurized fuel source through the gaseous fuel line, the mechanical fuel valve configured to open and close the liquid fuel line to selectively control fuel flow from the liquid fuel source to the dual fuel generator. A fuel lockout apparatus may couple to the mechanical fuel valve configured to prevent the pressurized fuel source from coupling to the gaseous fuel line while the liquid fuel line is open, and permit the pressurized fuel source to couple to the gaseous fuel line while the liquid fuel line is closed by the mechanical fuel valve.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

The operating environment of the invention is described with respect to a dual fuel generator. However, it will be appreciated by those skilled in the art that the invention is equally applicable for use with any dual fuel internal combustion engine. Moreover, the invention will be described with respect to a dual fuel generator configured to operate on a liquid fuel and a gaseous fuel. However, one skilled in the art will further appreciate that the invention is equally applicable for use with other fuel combinations for dual fuel generators and internal combustion engines.

Figure 1:
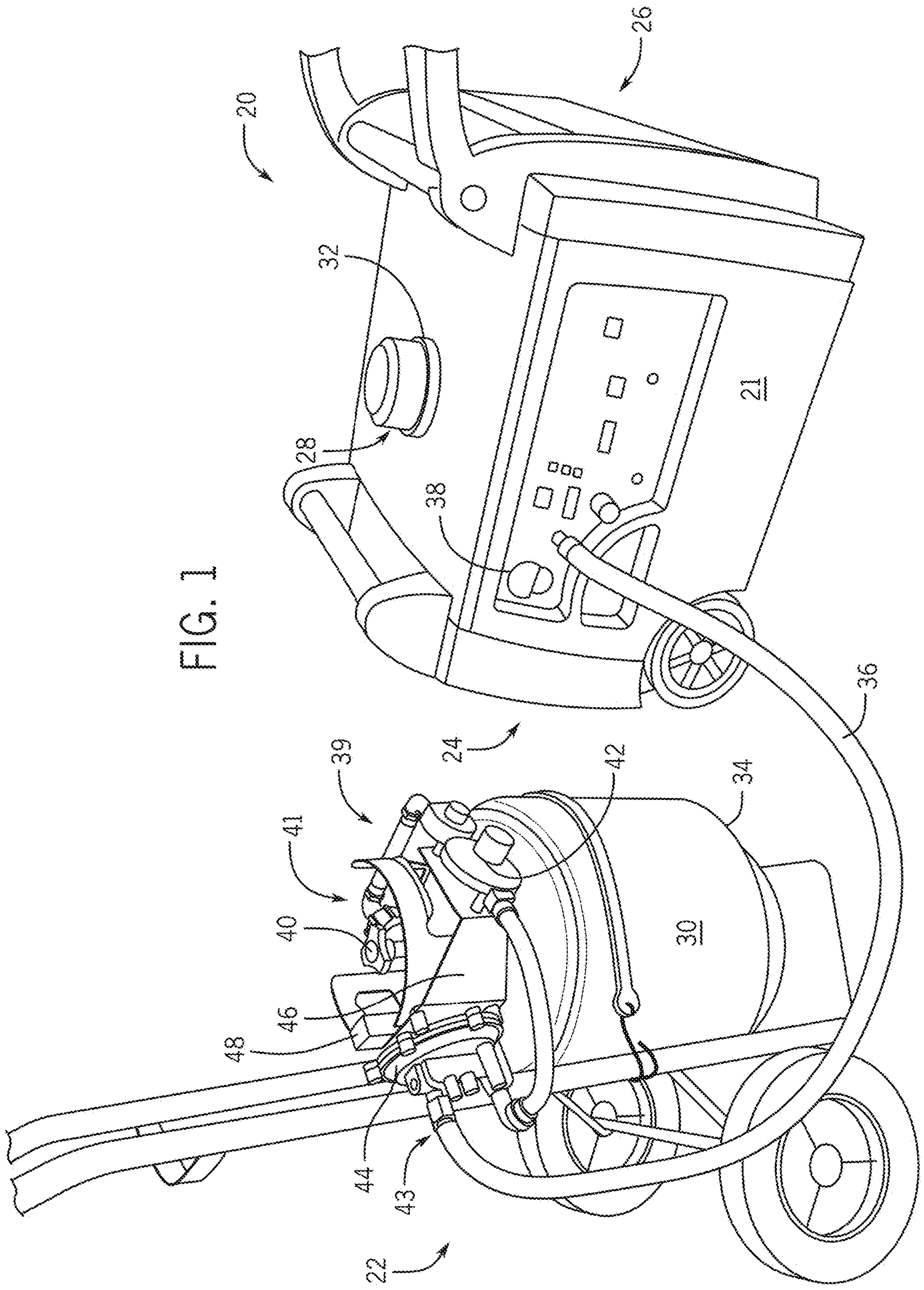
FIG. 1 is a perspective view of a dual fuel generator coupled to a fuel delivery system, according to an embodiment of the invention.

Referring to FIG. 1, a dual fuel generator 20 is coupled to a fuel delivery system 22, in accordance with an embodiment of the invention. Dual fuel generator 20 includes an internal combustion engine (not shown) within housing 21 at one end 24, operatively connected to an alternator also enclosed in housing 21 at another end 26, by conventional means. Dual fuel generator 20 is configured to operate on different fuels via either a first fuel source 28 or a second fuel source 30. In an exemplary embodiment of the invention, first fuel source 28 is a liquid fuel and second fuel source 30 is a gaseous fuel. The liquid fuel may be gasoline and the gaseous fuel may be liquid petroleum gas (LPG). Each can selectively operate the generator as desired and controlled by an operator. For instance, generator 20 may operate on gasoline for a first period of operation and then switch to LPG for a second period of operation. However, it is contemplated that dual fuel generator 20 is configured to operate on fuels other than gasoline and LPG (e.g., natural gas, biodiesel, etc.), and thus the scope of the invention is not meant to be limited strictly to a dual fuel arrangement where first fuel source 28 provides gasoline and second fuel source 30 provides LPG.

Figure 2:
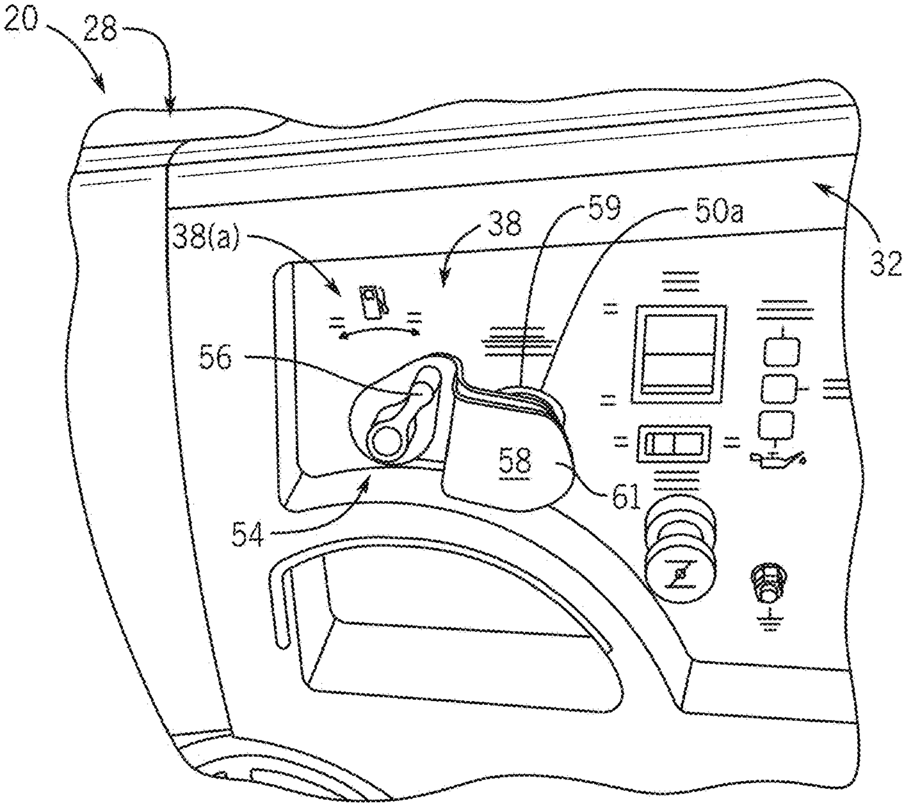
FIG. 2 is a detail view of a portion of the generator of FIG. 1 about a mechanical fuel lockout switch with the switch in a first position, according to an embodiment of the invention.
Figure 3:
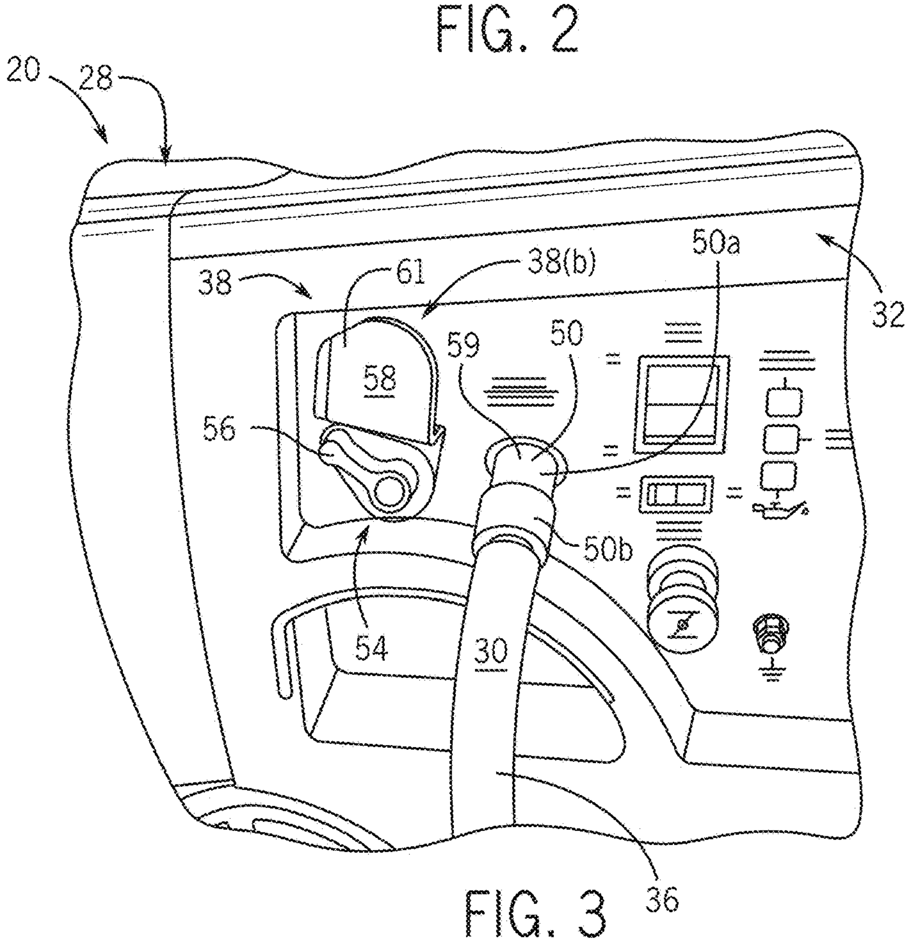
FIG. 3 is a detail view similar to FIG. 2 and showing the mechanical fuel lockout switch in a second position, with an LPG supply line connected thereto, according to an embodiment of the invention.

In one embodiment of the invention, dual fuel generator 20 includes a gasoline tank 32 or, generally, a liquid fuel tank, located inside cover 21 onboard generator 20 to provide gasoline to the engine as first fuel source 28. Gasoline tank 32 connects to a first fuel line to provide gasoline to the carburetor to run the engine, as will later be described with reference to FIGS. 4A and 4B. Generator 20 is also coupled to a pressurized fuel container 34, or a pressurized fuel source, located off board generator 20 to provide LPG to the engine as second fuel source 30. Pressurized fuel container 34 is coupled to generator 20 with an LPG supply hose 36. LPG supply hose 36 is coupled to a second fuel line within generator 20 to provide LPG to the carburetor to run the engine. Dual fuel generator 20 includes a mechanical fuel lockout switch 38 for selecting a desired fuel to be provided to the engine. The mechanical fuel lockout switch 38 is actuated to select first fuel source 28 when in a first position, as shown in FIG. 2, and alternately to select second fuel source 30 when in a second position, as shown in FIG. 3.

Referring back to FIG. 1, in an exemplary embodiment, fuel 30 from pressurized fuel container 34 is regulated using a fuel regulator system 39 for delivery to the engine. Fuel regulator system 39 includes one or more pressure regulators that reduce and control the pressure of the fuel from pressurized fuel container 34 and delivers fuel at a desired pressure for operation of the engine. Fuel regulator system 39 has an inlet 41 operatively coupled to a service valve 40 of pressurized fuel container 34 and an outlet 43 coupled to LPG supply hose 36. Fuel regulator system 39 includes a primary pressure regulator 42 coupled to pressurized fuel container 34 and a secondary pressure regulator 44. Primary pressure regulator 42 protects downstream components from high pressure of pressurized fuel container 34. Primary pressure regulator 42 receives LPG through service valve 40 of pressurized fuel container 34 and reduces the pressure of the LPG to a first stage. In one embodiment of the invention, the first stage may be delivered directly to generator 20 at a pressure required for operation of the engine.

In an exemplary embodiment of the invention, fuel regulator system 39 includes secondary pressure regulator 44 coupled to the outlet of primary pressure regulator 42 in order to use standard "off-the-shelf" components. Typically, the primary pressure regulator is mounted on the LPG tank, while the secondary pressure regulator is mounted on the component using the fuel, such as an engine or grill. Here, since generator 20 can be used as a gasoline only generator, secondary pressure regulator 44 is mounted off-board the generator to reduce size and cost of the generator. Secondary pressure regulator 44 receives LPG from primary pressure regulator 42 and further reduces the pressure of LPG to a second stage to be delivered to generator 20. In a system with two regulators, primary pressure regulator 42 regulates fuel received from pressurized fuel container 34 and reduces the pressure of the fuel to a level required for operation of secondary pressure regulator 44. Secondary pressure regulator 44 regulates fuel received from primary pressure regulator 42 and further reduces the pressure of the fuel to a level required for operation of generator 20. In addition, primary pressure regulator 42 may compensate for varying tank pressure as fuel is depleted while secondary pressure regulator 44 may compensate for varying demand from generator 20.

In accordance with an exemplary embodiment of the invention, fuel regulator system 39 includes both the primary and secondary regulators, or a custom single regulator, but in any case is located remotely, or off-board, from dual fuel generator 20. Fuel regulator system 39 may be directly mounted to pressurized fuel container 34 using a regulator mounting bracket 46. Regulator mounting bracket 46 has mounting locations for primary pressure regulator 42 and secondary pressure regulator 44. Regulator mounting bracket 46 also has a securing mechanism 48 to secure regulator mounting bracket 46 to pressurized fuel container 34.

In another embodiment of the invention, primary pressure regulator 42 is mounted on regulator mounting bracket 46 while secondary pressure regulator 44 could be mounted on or near generator 20. In yet another embodiment of the invention, a dual stage regulator may regulate the fuel received from pressurized fuel container 34 and deliver fuel at a pressure required for operation of generator 20. Such a dual stage regulator may regulate the fuel to the second stage within a single structure. The dual stage regulator may be mounted directly on fuel container 34.

Referring to FIG. 2, a detail view of a portion of generator 20 of FIG. 1 depicts mechanical fuel lockout switch 38 in a first position 38(*a*), in accordance with an embodiment of the invention. In this position, mechanical fuel lockout switch 38 provides gasoline flow from gasoline tank 32 to the engine while preventing connection of an LPG supply line to fuel inlet 59 of the second fuel line, as will later be discussed in detail with reference to FIGS. 4A and 4B. Still referring to FIG. 2, mechanical fuel lockout switch 38 provides a combination liquid fuel shutoff valve and a gaseous fuel supply lockout that prevents simultaneous delivery of fuel to the engine from gasoline tank 32 and pressurized fuel container 34, FIG. 1. As such, mechanical fuel lockout switch 38 provides a fuel selector to ensure only the selected fuel is provided to dual fuel generator 20.

Mechanical fuel lockout switch 38, FIG. 2, includes mechanical fuel valve 54 actuatable between first position 38(*a*) as shown in FIG. 2 and second position 38(*b*) as shown in FIG. 3 to selectively control fuel flow to the dual fuel engine from first fuel source 28 through a first fuel line and second fuel source 30 through a second fuel line 36. Mechanical fuel lockout switch 38 may also include fuel lockout apparatus 58 coupled to mechanical fuel valve 54 to communicate fuel sources individually to generator 20. In one embodiment of the invention, fuel lockout apparatus 58 communicates first fuel source 28 to the engine by actuating mechanical fuel valve 54 to first position 38(*a*) to open the first fuel line as shown in FIG. 2, and communicates second fuel source 30 to the engine by actuating mechanical fuel valve 54 to second position 38(*b*) to open communication of the second fuel source 30 to the engine as shown in FIG. 3. Referring back to FIG. 2, when mechanical fuel valve 54 is in first position 38(*a*), fuel lockout apparatus 58 communicates first fuel source 28 to the dual fuel engine and prevents communication between the second fuel source and the dual fuel engine.

Figure 4A:
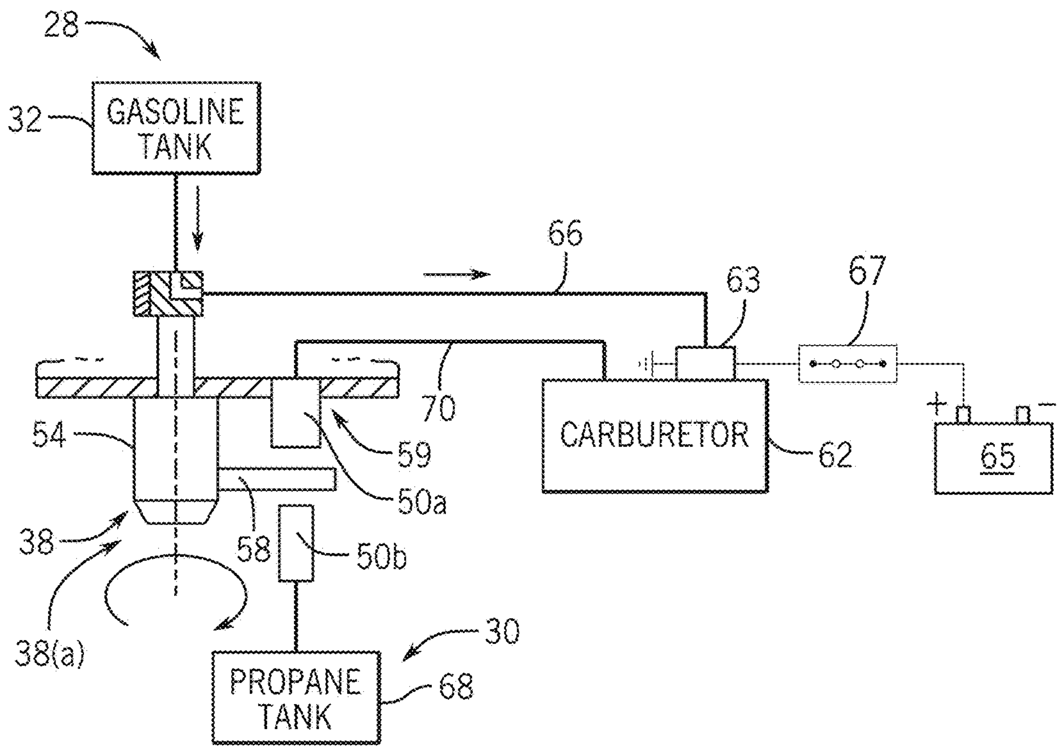
FIG. 4A is a schematic diagram of a fuel system for the dual fuel generator of FIG. 1 showing a liquid fuel source in communication with a carburetor of the generator consistent with the first position of the switch as shown in FIG. 2, according to an embodiment of the invention.
Figure 4B:
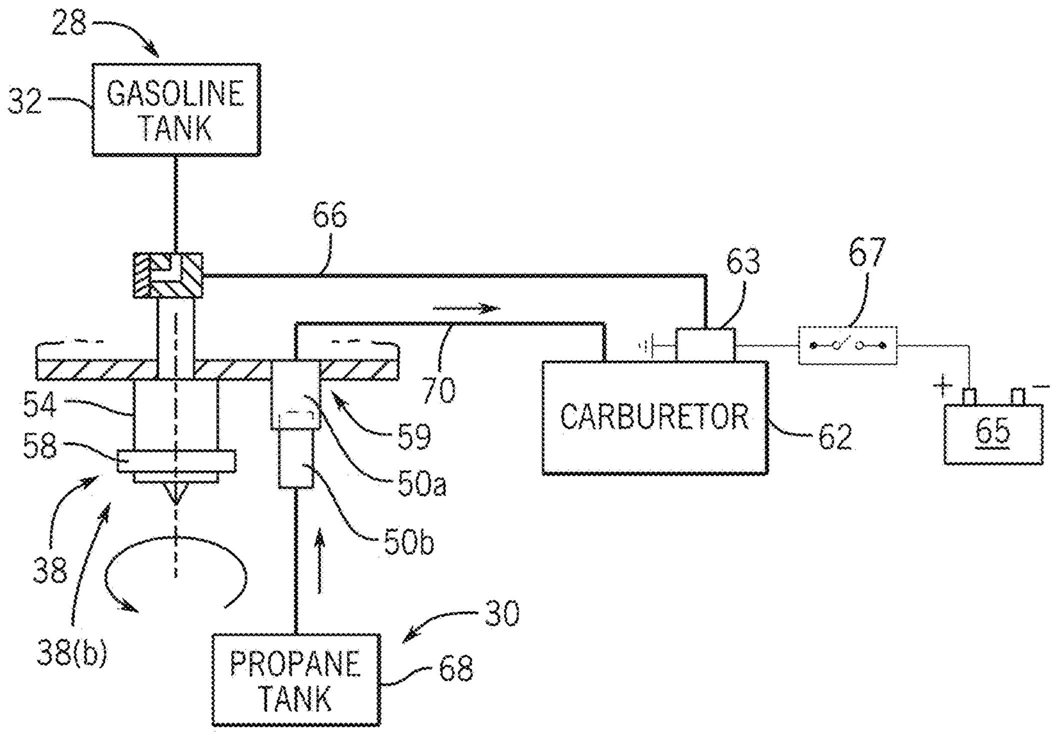
FIG. 4B is a schematic diagram of the fuel system of FIG. 4A showing a gaseous fuel source in communication with a carburetor of the generator of FIG. 1 consistent with the second position of the switch as shown in FIG. 3, according to an embodiment of the invention.

In an exemplary embodiment of the invention, mechanical fuel valve 54 controls the flow of LPG to the engine by actuating fuel lockout apparatus 58 to block or unblock fuel inlet 59 for the second fuel source. Mechanical fuel valve 54 is coupled to the first fuel line, as shown in FIGS. 4A and 4B, and therefore can control the flow of gasoline to the engine by opening and closing the first fuel line. When the mechanical fuel valve 54, FIG. 2, is in the first position 38(*a*), gasoline flows from the gasoline tank to the engine and the fuel lockout apparatus 58 blocks the fuel inlet 59. Accordingly, fuel lockout apparatus 58 prevents LPG flow to generator 20 when the mechanical fuel valve 54 is in first position 38(*a*) wherein the engine is operated on gasoline.

Mechanical fuel valve 54 includes a fuel valve handle 56 to control the opening and closing of the valve. Fuel valve handle 56 is movable between first position 38(*a*) as shown in FIG. 2 and second position 38(*b*) as shown in FIG. 3. Mechanical fuel valve 54 opens the first fuel line (to enable liquid fuel flow to the engine) when fuel valve handle 56 is in the first position, and mechanical fuel valve 54 closes the first fuel line (to prevent liquid fuel flow to the engine) when fuel valve handle 56 is in the second position. Thus, when fuel valve handle 56 is in first position 38(*a*) as shown in FIG. 2, mechanical fuel valve 54 opens the first fuel line and allows gasoline from gasoline tank 32 to flow to the engine.

Fuel valve handle 56 is coupled to fuel lockout apparatus 58. Fuel valve handle 56 actuates with fuel lockout apparatus 58 to prevent LPG flow to generator 20 when gasoline flow to the generator is enabled. Fuel lockout apparatus 58 is controlled by fuel valve handle 56 so that moving fuel valve handle 56 to the first position causes fuel lockout apparatus 58 to block fuel inlet 59 for LPG, and moving fuel valve handle 56 to the second position causes fuel lockout apparatus 58 to unblock fuel inlet 59 for LPG.

In an exemplary embodiment of the invention, fuel valve handle 56 rotates between the first position and the second position and fuel lockout apparatus 58 is rigidly coupled to the rotating handle. Fuel lockout apparatus 58 may include a fuel inlet cover 61, which may be a flange, coupled to fuel valve handle 56 so that fuel inlet cover 61 rotates with the handle. Fuel inlet cover 61 extends radially outward from fuel valve handle 56 and sweeps over fuel inlet 59 for LPG as fuel valve handle 56 rotates. That is, fuel inlet cover 61 rotates transversely across fuel inlet 59 and blocks access thereto. Accordingly, fuel inlet cover 61 prevents LPG flow to generator 20 when fuel valve handle 56 is in first position 38(*a*) to allow gasoline to run the engine.

Referring to FIG. 3, a detail view of a portion of generator 20 of FIG. 1 depicts mechanical fuel lockout switch 38 in a second position 38(*b*), in accordance with an embodiment of the invention. In this position, the mechanical fuel lockout switch 38 provides a disconnect to stop gasoline flow from gasoline tank 32 to the engine while allowing connection of LPG supply hose 36 to fuel inlet 59 of the second fuel line. FIG. 3 further shows LPG supply hose 36 coupling second fuel source 30 to generator 20 to deliver LPG to run the generator.

Mechanical fuel lockout switch 38 includes mechanical fuel valve 54 coupled to fuel lockout apparatus 58 to prevent gasoline flow to generator 20 when LPG from the LPG service hose 36 is supplied to the engine. In one embodiment of the invention, actuation of mechanical fuel valve 54 to second position 38(*b*) causes fuel lockout apparatus 58 to allow communication of second fuel source 30 to the dual fuel engine, and interrupts the first fuel source 28 communication with the dual fuel engine. The position of fuel lockout apparatus 58 prevents the fuel valve handle 56 from moving to first position 38(*a*) (FIG. 2) while LPG supply hose 36 is connected to generator 20.

A quick-disconnect hose coupling 50, also referred to as a quick-connect hose coupling, connects LPG supply hose 36 to generator 20 so that LPG supply hose 36 may be quickly attached and detached from generator 20. Hose coupling 50 has a first end 50*a* mounted on the external surface of generator 20 and coupled to supply the second fuel to the engine. Hose coupling 50 has a second end 50*b* coupled to the outlet of LPG supply hose 36. Hose coupling 50 has a valve that opens when the couplings are engaged and closes when the couplings are disengaged. As such, quick-disconnect hose coupling 50 automatically opens when connected to enable fuel flow from LPG supply hose 36 to the engine. Hose coupling 50 automatically disconnects fluid communication when disconnected. Accordingly, when the supply hose is detached from generator 20, the coupling 50 is automatically closed so that fuel does not escape and unwanted air does not enter the fuel system.

In one embodiment, fuel inlet cover 61 is coupled to fuel valve handle 56 so that it is spaced apart from the surface of generator 20 to provide clearance for first end 50*a* of the quick-disconnect hose coupling 50 that protrudes from the surface of generator 20. As shown in FIG. 2, fuel inlet cover 61 blocks off first end 50*a* of the quick-disconnect hose coupling when fuel valve handle 56 is rotated to first position 38(*a*) to enable gasoline flow so that fuel inlet cover 61 prevents connection of LPG supply hose 36 (FIG. 3) to generator 20. As shown in FIG. 3, fuel inlet cover 61 uncovers first end 50*a* of the quick-disconnect hose coupling 50 when fuel valve handle 56 is rotated to second position 38(*b*) to disable gasoline flow so that fuel inlet cover 61 permits connection of LPG supply hose 36 to generator 20.

To operate generator 20 on LPG, fuel valve handle 56 is turned to second position 38(*b*) to disable the flow of gasoline to the engine and to expose first end 50*a* of hose coupling 50 on generator 20. LPG supply hose 36 is then connected to generator 20 via hose coupling 50 to enable the flow of LPG to the engine. To operate generator 20 on gasoline, LPG supply hose 36 is disconnected from generator 20 via hose coupling 50 to disable the flow of LPG to the engine and to unblock fuel valve handle 56 from rotating to the first position. As shown in FIG. 2, fuel valve handle 56 is then turned to first position 38(*a*) to enable the flow of gasoline to generator 20.

Referring to FIG. 4A, a schematic diagram of a fuel system for a dual fuel engine shows mechanical fuel lockout switch 38 in first position 38(*a*) to provide communication between the first fuel source 28 and dual fuel carburetor 62, according to an embodiment of the invention. Mechanical fuel lockout switch 38 prevents communication between second fuel source 30 and dual fuel carburetor 62 when the switch is in first position 38(*a*). In one embodiment of the invention, first fuel source 28 includes a gasoline tank 32 to provide gasoline to carburetor 62 through a first fuel line 66, and second fuel source 30 includes a propane or LPG tank 68 to provide propane or LPG to carburetor 62 through a second fuel line 70. Accordingly, first fuel line 66 may be a liquid fuel line and second fuel line 70 may be a gaseous fuel line.

Mechanical fuel lockout switch 38 includes a mechanical fuel valve 54 actuatable between first position 38(*a*) as shown in FIG. 4A and second position 38(*b*) as shown in FIG. 4B to selectively control fuel flow to the dual fuel engine from first fuel source 28 through first fuel line 66 and second fuel source 30 through second fuel line 70. Referring back to FIG. 4A, mechanical fuel valve 54 selectively controls fuel flow through first fuel line 66 by opening the line when the mechanical fuel lockout switch 38 actuates to first position 38(*a*). Mechanical fuel valve 54 may be coupled to fuel lockout apparatus 58 that actuates with mechanical fuel valve 54 to block and unblock fuel inlet 59 of second fuel line 70. First end 50*a* of the quick-disconnect hose coupling is located at fuel inlet 59 and a mating end 50*b* of the quick-disconnect hose coupling is coupled to the propane or LPG tank 68. Actuation of mechanical fuel valve 54 to first position 38(*a*) causes fuel lockout apparatus 58 to block fuel inlet 59 to prevent coupling the first end 50*a* and second end 50*b* of the quick-disconnect hose coupling together, and actuation of mechanical fuel valve 54 to another position causes fuel lockout apparatus 58 to unblock fuel inlet 59 to permit attaching first end 50*a* and second end 50*b* together.

In one embodiment of the invention, a fuel cut solenoid 63 couples to carburetor 62 to regulate liquid fuel flow into a main nozzle within the carburetor. Fuel cut solenoid 63 is advantageous to control liquid fuel flow downstream of a float bowl in the carburetor and can stop fuel flow to the engine immediately after ignition shutdown. As such, fuel cut solenoid 63 prevents the engine from drawing in fuel from the float bowl while the engine shuts off. Fuel cut solenoid 63 also traps fuel in the float bowl to eliminate delay in filling the bowl when starting the engine on liquid fuel, and prevents liquid fuel flow from the float bowl to the engine when starting on gaseous fuel.

Fuel cut solenoid 63 may regulate fuel flow through multiple fuel lines in carburetor 62 that provide fuel from the float bowl to the engine. For instance, carburetor 62 may have a main fuel line and an idle fuel line that receive fuel from the float bowl. Fuel cut solenoid 63 may control fuel flow through all of the fuel lines that receive fuel from the float bowl or may regulate only some of the fuel lines. As such, fuel cut solenoid 63 may block fuel flow through the main fuel line while small amounts of fuel can flow through the idle fuel line.

Fuel cut solenoid 63 preferably operates as a normally closed valve that opens when powered by a 12 volt battery 65, although fuel cut solenoid 63 may also be operated as a normally open valve. The normally closed valve is opened for gasoline mode to allow gasoline flow to the engine and closed for LPG mode to prevent gasoline flow to the engine. Fuel cut solenoid 63 is operated by an electrical switch 67 which may be mechanically actuated and controlled by mechanical fuel lockout switch 38. As such, actuation of mechanical fuel lockout switch 38 to first position 38(*a*) closes electrical switch 67 to power and open fuel cut solenoid 63 as represented in FIG. 4A, and actuation of mechanical fuel lockout switch 38 to second position 38(*b*) opens electrical switch 67 to interrupt power and close fuel cut solenoid 63 as represented in FIG. 4B.

Referring to FIG. 4B, a schematic diagram of a fuel system for a dual fuel engine shows mechanical fuel lockout switch 38 in second position 38(*b*) to provide communication between second fuel source 30 and dual fuel carburetor 62, according to an embodiment of the invention. Mechanical fuel lockout switch 38 prevents communication between first fuel source 28 and dual fuel carburetor 62 when the switch is in second position 38(*b*). The dual fuel engine has a first fuel line 66 to provide fuel from first fuel source 28 to carburetor 62 and a second fuel line 70 to provide fuel from second fuel source 30 to carburetor 62.

Mechanical fuel lockout switch 38 includes mechanical fuel valve 54 that selectively controls fuel flow through first fuel line 66 by closing the line when mechanical fuel lockout switch 38 actuates to second position 38(*b*). Mechanical fuel lockout switch 38 may also include a mechanical lockout apparatus 58 to block and unblock fuel inlet 59 of the second fuel line 70. Fuel inlet 59 may include first end 50*a* of the quick-connect hose coupling mounted on the generator and coupled to second fuel line 70. Second end 50*b* of the quick-connect hose coupling is coupled to the outlet of second fuel source 30, and the first end 50*a* mates with second end 50*b* to quickly attach propane or LPG tank 68 to second fuel line 70. Fuel lockout apparatus 58 may also hold mechanical fuel lockout switch 38 in second position 38(*b*) when the propane or LPG tank 68 is coupled to the engine via the ends 50*a*, 50*b* of the quick-connect hose coupling.

Fuel cut solenoid 63 couples to carburetor 62 to regulate liquid fuel flow through the carburetor as described with respect to FIG. 4A. FIG. 4B shows electrical switch 67 opened to interrupt power and close fuel cut solenoid 63 for LPG mode when mechanical fuel lockout switch 38 is in second position 38(*b*).

FIGS. 4A and 4B depict an embodiment where mechanical fuel valve 54 operates along first fuel line 66 to provide a flow path for first fuel source 28 to carburetor 62 when the valve is in first position 38(*a*). That is, mechanical fuel valve 54 may control a single fuel line that runs through the valve while operating fuel lockout apparatus 58 to control fuel flow through second fuel line 70. Embodiments of the invention also contemplate mechanical fuel valve 54 configured to operate along second fuel line 70 to provide a flow path for second fuel source 30 to carburetor 62 when the valve is in second position 38(*b*). Mechanical fuel valve 54 may be configured to control multiple fuel lines that run through the valve according to embodiments of the invention.

Figure 5:
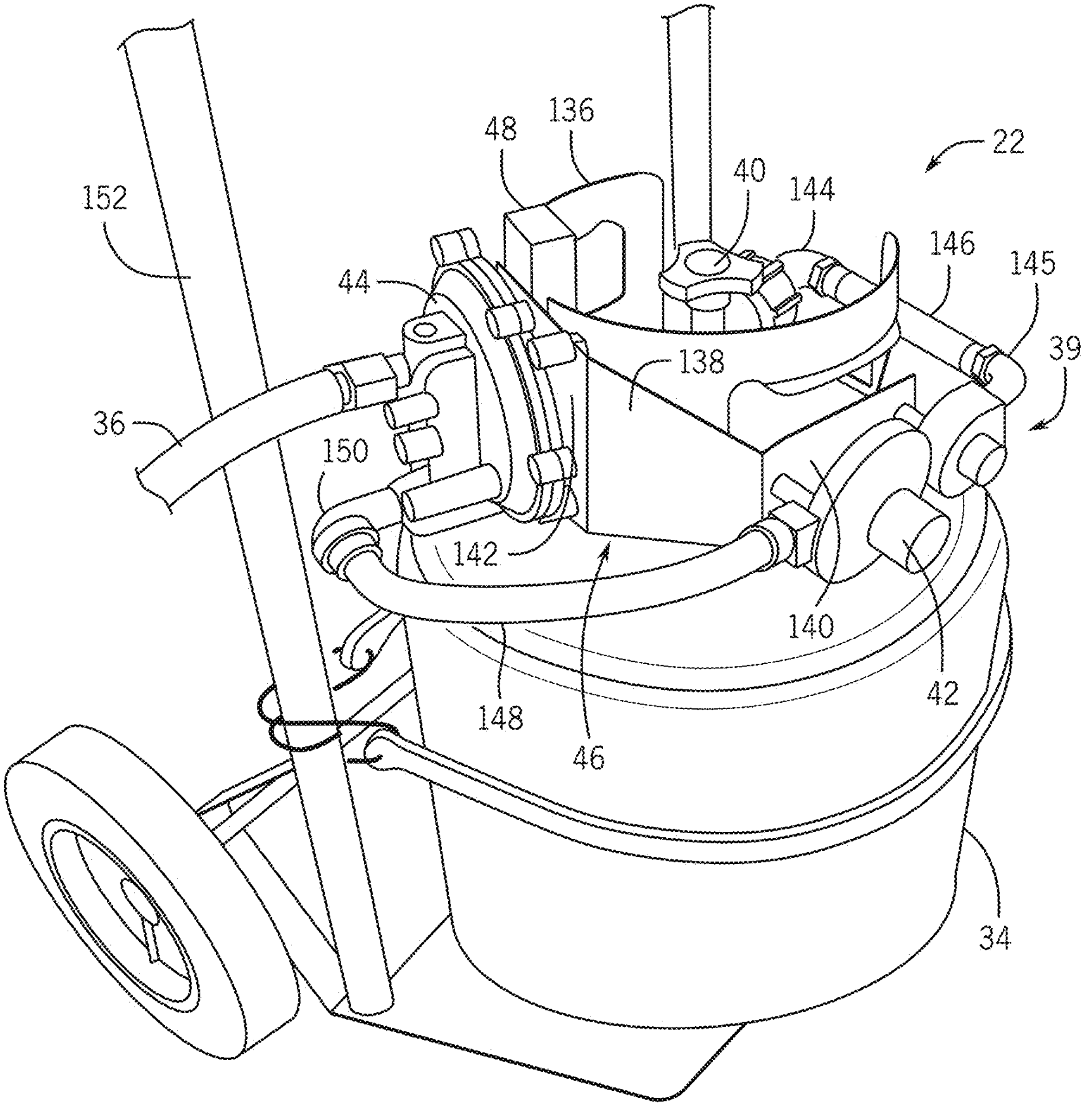
FIG. 5 is a perspective view of a fuel delivery system for the dual fuel generator of FIG. 1, according to an embodiment of the invention.

Referring now to FIG. 5, a perspective view of fuel delivery system 22 for dual fuel generator 20 of FIG. 1 is shown, in accordance with an embodiment of the invention. Fuel delivery system 22 includes a mounting arrangement for fuel regulator system 39. The mounting arrangement includes regulator mounting bracket 46 for mounting fuel regulator system 39. Regulator mounting bracket 46 extends around the outer periphery of collar 136 on pressurized fuel container 34. Regulator mounting bracket 46 has securing mechanism 48 to secure to collar 136. In one embodiment, securing mechanism 48 is a rigid component that extends inward from regulator mounting bracket 46 with a slot for receiving collar 136 to hold regulator mounting bracket 46 to collar 136.

Regulator mounting bracket 46 provides mounting locations for pressure regulators. In one embodiment, regulator mounting bracket 46 is made of sheet metal bent in two locations to provide a central panel 138, a first outer panel 140, and a second outer panel 142 for mounting the regulators. The panels may be angled from each other such that regulator mounting bracket 46 fits around collar 136. Primary pressure regulator 42 mounts on first outer panel 140 and secondary pressure regulator 44 mounts on second outer panel 142. The panels are sized according to their respective regulators. Accordingly, second outer panel 142 is larger than first outer panel 140 if secondary pressure regulator 44 is larger than primary pressure regulator 42. Panels 140, 142 have fasteners or openings to receive fasteners to couple respective regulators 42, 44 to the panels. Regulator mounting bracket 46 rests on top of pressurized fuel container 34 and engages the periphery of collar 136 to support fuel regulator system 39 on the container.

In one embodiment of the invention, primary pressure regulator 42 couples to two ninety degree elbows 144, 145 to reach around collar 136 in order to couple to service valve 40. The two elbows 144, 145 are joined by a hose or pipe 146 that leads from elbow 144 at service valve 40 to elbow 145 at the outer periphery of collar 136. The outlet of primary pressure regulator 42 couples to a hose 148 that extends to another ninety degree elbow 150 coupled to the inlet of secondary pressure regulator 44. Secondary pressure regulator 44 couples to LPG supply hose 36. Pressurized fuel container 34 may be strapped to a dolly 152.

Figure 6:
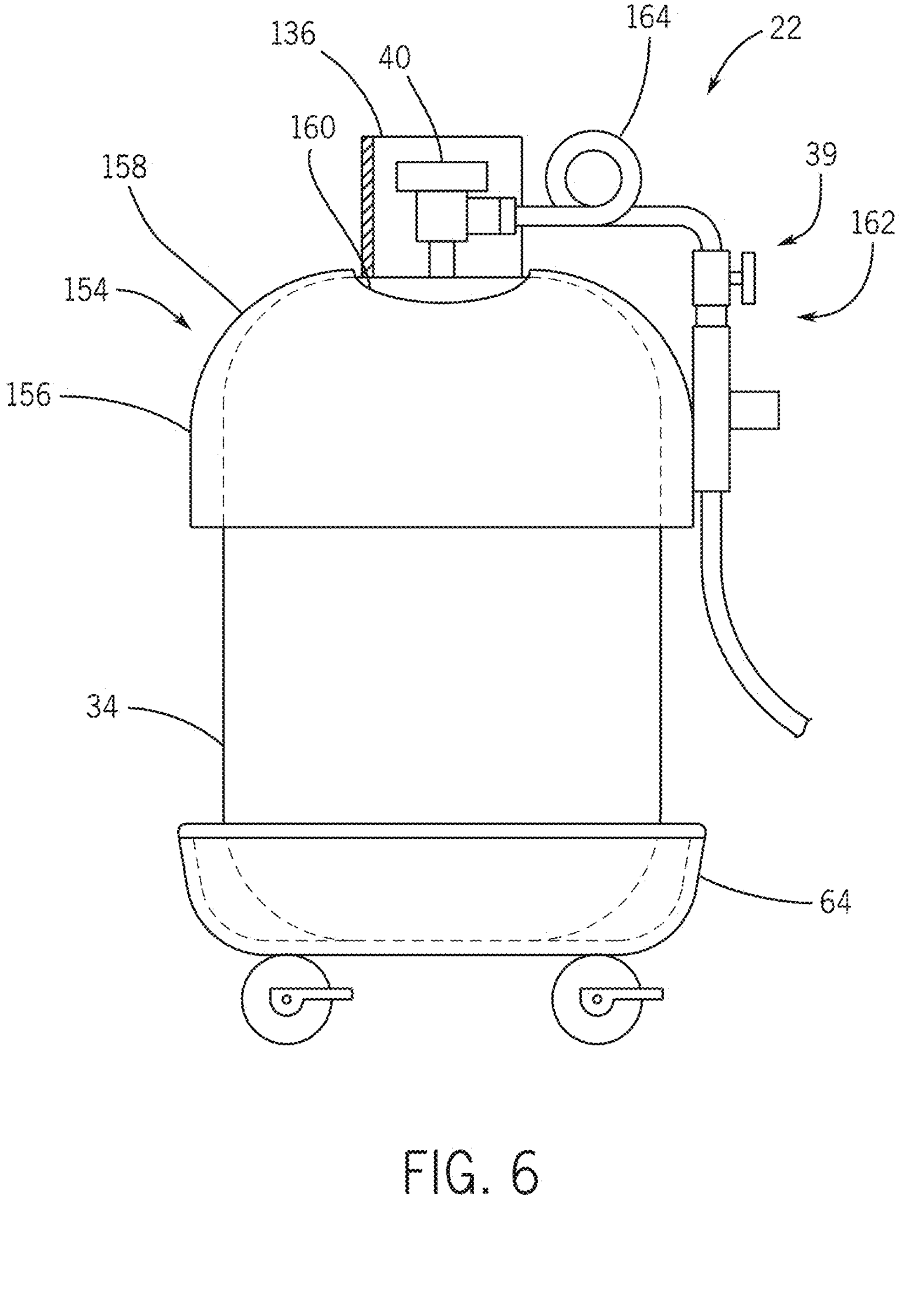
FIG. 6 is a side view of a fuel delivery system for the dual fuel generator of FIG. 1, according to an embodiment of the invention.

Referring now to FIG. 6, a side view of another fuel delivery system 22 for dual fuel generator 20 of FIG. 1 is shown, in accordance with an embodiment of the invention. Fuel delivery system 22 includes a mounting arrangement for fuel regulator system 39. The mounting arrangement includes a regulator mounting structure 154 for mounting fuel regulator system 39 to pressurized fuel container 34. Regulator mounting structure 154 includes a cylinder 156 that surrounds the circumference of pressurized fuel container 34 to secure regulator mounting structure 154 radially along the circumference of pressurized fuel container 34. Cylinder 156 couples to a dome 158 to support cylinder 156 relative to the top of pressurized fuel container 34. Dome 158 has a central opening 160 through which collar 136 of pressurized fuel container 34 extends. Collar 136 of pressurized fuel container 34 extends through dome 158 so that service valve 40 is easily accessible from above regulator mounting structure 154 and so that dome 158 sits on pressurized fuel container 34 around collar 136.

Regulator mounting structure 154 supports pressure regulators around the outer circumference of cylinder 156. In some embodiments of the invention, a dual stage pressure regulator 162 functions as both a primary pressure regulator and a secondary pressure regulator in a single integral component, and dual stage pressure regulator 162 may be mounted on regulator mounting structure 154. In other embodiments of the invention, primary pressure regulator 42 (FIG. 5) is mounted to service valve 40 while secondary pressure regulator 44 (FIG. 5) is mounted on regulator mounting structure 154. Alternatively, both primary pressure regulator 42 (FIG. 5) and secondary pressure regulator 44 (FIG. 5) may be mounted on regulator mounting structure 154.

Fuel regulator system 39 may be coupled to service valve 40 by a flexible connector called a pigtail 164. Pigtail 164 absorbs shock in the system from pressure surges and from movement of downstream components. Pigtail 164 can be looped to conserve space and therefore pressurized fuel container 34 is referred to as an LPG pig. Accordingly, regulator mounting structure 154 is referred to as a pig hat because it fits on the LPG pig. Pressurized fuel container 34 may be secured to a platform or mobile cart 64 for stability or transportation. In another embodiment, a regulator mounting device, including regulator mounting structure 154 or regulator mounting bracket 46 (FIG. 5), is secured directly to a platform or a mobile cart.

Beneficially, embodiments of the invention provide for a mechanical fuel lockout switch to ensure that two fuels are not simultaneously delivered to a dual fuel internal combustion engine. Embodiments of the invention also provide for a dual fuel generator with a remotely mounted gaseous fuel regulator system.

Therefore, according to one embodiment of the invention, a mechanical fuel lockout switch for a dual fuel engine includes a mechanical fuel valve actuatable between a first position and a second position to selectively control fuel flow to the dual fuel engine from a first fuel source through a first fuel line and a second fuel source through a second fuel line. The mechanical fuel valve may be configured to allow communication between the first fuel source and the dual fuel engine and prevent communication between the second fuel source and the dual fuel engine while in the first position, and prevent communication between the first fuel source and the dual fuel engine while in the second position. The mechanical fuel lockout switch may also include a fuel lockout apparatus coupled to the mechanical fuel valve and configured to prevent the second fuel source from coupling to the second fuel line while the mechanical fuel valve is in the first position, and permit the second fuel source to couple to the second fuel line while the mechanical fuel valve is in the second position.

According to another embodiment of the invention, a mechanical fuel lockout switch for a dual fuel engine includes a mechanical fuel valve actuatable between a first position and a second position to selectively control fuel flow to the dual fuel engine from a first fuel source through a first fuel line and a second fuel source through a second fuel line. The mechanical fuel valve may be configured to allow communication between the first fuel source and the dual fuel engine and prevent communication between the second fuel source and the dual fuel engine while the first position, and prevent communication between the first fuel source and the dual fuel engine while in the second position. The mechanical fuel lockout switch may also include a fuel lockout apparatus coupled to the mechanical fuel valve and configured to prevent actuation of the mechanical fuel valve to the first position when the second fuel source is in communication with the dual fuel engine.

According to yet another embodiment of the invention, a dual fuel generator and fuel delivery system includes a dual fuel generator configured to operate on a liquid fuel supplied from a liquid fuel source through a liquid fuel line and a gaseous fuel supplied from a pressurized fuel source through a gaseous fuel line, and a fuel regulator system located off board the dual fuel generator. The fuel regulator system may include a primary pressure regulator couplable to a service valve of the pressurized fuel source and configured to regulate the gaseous fuel supplied from the pressurized fuel source to a reduced pressure, and a secondary pressure regulator couplable to the primary pressure regulator and configured to regulate the gaseous fuel supplied from the primary pressure regulator to a desired pressure for delivery through the gaseous fuel line to operate the dual fuel generator. The dual fuel generator and fuel delivery system may also include a mechanical fuel valve actuatable between a first position and a second position to selectively control fuel flow to the dual fuel generator from the liquid fuel source through the liquid fuel line and the pressurized fuel source through the gaseous fuel line, the mechanical fuel valve configured to open and close the liquid fuel line to selectively control fuel flow from the liquid fuel source to the dual fuel generator. A fuel lockout apparatus may couple to the mechanical fuel valve configured to prevent the pressurized fuel source from coupling to the gaseous fuel line while the liquid fuel line is open, and permit the pressurized fuel source to couple to the gaseous fuel line while the liquid fuel line is closed by the mechanical fuel valve.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mechanical fuel lockout switch for a dual fuel engine comprising:
- a mechanical fuel valve actuatable between:
  - a first position to allow communication between a first fuel source and the dual fuel engine through a first fuel line, and
  - a second position to prevent communication between the first fuel source and the dual fuel engine while a second fuel source is allowed to communicate with the dual fuel engine through a second fuel line; and
- a fuel lockout apparatus coupled to the mechanical fuel valve to control communication of the first fuel source or the second fuel source with the dual fuel engine.

2. The mechanical fuel lockout switch of claim 1 wherein the fuel lockout apparatus prevents actuation of the mechanical fuel valve to the first position when the second fuel source is in communication with the dual fuel engine.

3. The mechanical fuel lockout switch of claim 1 wherein the fuel lockout apparatus comprises a flange rigidly coupled to the mechanical fuel valve and configured to:
- cover an inlet of the second fuel line while the mechanical fuel valve is in the first position, and
- uncover the inlet of the second fuel line while the mechanical fuel valve is in the second position.

4. The mechanical fuel lockout switch of claim 3 wherein the mechanical fuel valve is configured to rotate between the first position and the second position and the flange is configured to rotate transversely across the inlet of the second fuel line.

5. The mechanical fuel lockout switch of claim 3 further comprising:
- a first end of a quick-disconnect hose coupling attached to the inlet of the second fuel line; and
- a second end of the quick-disconnect hose coupling configured to mate with the first end of the quick-disconnect hose coupling to couple the second fuel source to the second fuel line.

6. The mechanical fuel lockout switch of claim 1 wherein the mechanical fuel valve and the fuel lockout apparatus operate together to ensure that fuel from the first fuel source and fuel from the second fuel source are not simultaneously delivered to the dual fuel engine.

7. The mechanical fuel lockout switch of claim 6 wherein the mechanical fuel valve is configured to:
- when the mechanical fuel valve is in the first position, a liquid fuel tank of the first fuel source is allowed to provide liquid fuel to the dual fuel engine, and
- when the mechanical fuel valve is in the second position, a pressurized fuel container of the second fuel source is allowed to provide gaseous fuel to the dual fuel engine.

8. A multi-fuel generator having a mechanical fuel lockout switch for a multi-fuel engine, the multi-fuel generator comprising:

a multi-fuel engine operable on a liquid fuel from a liquid fuel source and a gaseous fuel from a gaseous fuel source;

an alternator operatively connected to the multi-fuel engine; and a mechanical fuel lockout switch comprising:

a mechanical fuel valve actuatable between:

a first position to allow communication between a liquid fuel source and the multi-fuel engine through a liquid fuel line, and a second position to prevent communication between the liquid fuel source and the multi-fuel engine while a gaseous fuel source is allowed to communicate with the multi-fuel engine through a gaseous fuel line; and a rotatable fuel lockout coupled to the mechanical fuel valve and configured to:

prevent the gaseous fuel source from coupling to the gaseous fuel line while the mechanical fuel valve is in the first position, and allow the gaseous fuel source to communicate with the multi-fuel engine while the mechanical fuel valve is in the second position.

* * * * *